Patented Jan. 17, 1933

1,894,931

UNITED STATES PATENT OFFICE

WILLIAM J. O'BRIEN, OF BALTIMORE, MARYLAND, ASSIGNOR TO GLIDDEN COMPANY, OF CLEVELAND, OHIO, A CORPORATION OF OHIO

PIGMENT AND METHOD OF PRODUCING THE SAME

No Drawing.      Application filed April 10, 1930.   Serial No. 443,249.

This invention relates to the production of pigments which include cadmium, selenium, and preferably barium. It is my belief that under my process the cadmium and selenium are combined in a double salt which is precipitated with the barium to form a final product which acts in many ways like lithopone.

Selenium does not react with cadmium sulphate and attempts to make complex salts by a direct combination method are unsuccessful, but I have found that cadmium sulphate does react with selenium when the latter is dissolved in barium sulphide. The precipitate which results is a dirty brown color, but if properly calcined will turn to a bright red. The exact tone can be varied by the amount of selenium included. If the amount of selenium is small, a pigment of a reddish orange can be obtained, but the material can be varied all the way to a deep purplish red by increasing the amount of selenium. The product is exceedingly stable against changes brought on by exposure to light and is a great improvement over the known reds such as toluadine toner, para reds and Chinese vermilion. It has the further advantage that it is not affected by sulphur gas and can be mixed with other sulphide colors without change. In general, it has properties similar to those of lithopone.

In carrying out the invention, selenium is dissolved in a solution of barium sulphide; for example, if a light red color is to be produced I may use from two to three parts of selenium to 200 parts of barium sulphide solution in water, containing about 14% of barium sulphide. For the deep colors from 10 to 15 parts of selenium may be included in the same amount of barium sulphide solution. If desired, I may substitute for part or all of the barium sulphide, sodium sulphide which will have the same effect except that it will be washed out later, thus increasing the concentration of selenium.

Selenium dissolves in barium sulphide solution probably according to the formula:

$$BaS + Se_x = BaSSe_x$$

In this case the selenium acts in a manner analagous to sulphur which can be added to barium sulphide to form various barium polysulphides. This intermediate product can properly be termed barium sulpho-selenide.

To the barium sulpho-selenide is added a solution of cadmium sulphate. Such solution may, for example, contain from 10 to 15% of cadmium metal. This solution is added very slightly in excess, preferably to give a pH value of 6.4 to 6.7, though this is not essential. When the cadmium sulphate is added, a precipitate is formed probably according to the following formula:

$$BaSSe_x + CdSO_4 = CdSSe_x \cdot BaSO_4$$

This precipitate, which is a dirty brown color, is boiled in water for about one hour to further the reaction. It is then filter pressed and dried and then calcined. For calcination I have found that a temperature of from about 500° to 650° C. gives most satisfactory results. As the calcination goes on, the color will get brighter and brighter, as in the case of lithopone. The time of calcination will vary, depending on the charge that is being treated, but may be indicated by the fact that satisfactory results with a charge of 100 pounds can be obtained in about one-half hour.

What I claim is:

1. In the process of producing pigments the steps of dissolving selenium in a sulphide of a material selected from the group consisting of barium and sodium and precipitating with cadmium sulphate.

2. The process of producing pigments which comprises the steps of dissolving selenium in a solution comprising barium sulphide, precipitating with cadmium sulphate and calcining the precipitate.

WILLIAM J. O'BRIEN.